US011044414B2

(12) United States Patent
Kim et al.

(10) Patent No.: US 11,044,414 B2
(45) Date of Patent: Jun. 22, 2021

(54) ELECTRONIC DEVICE AND CONTROL METHOD THEREFOR

(71) Applicant: Samsung Electronics Co., Ltd., Gyeonggi-do (KR)

(72) Inventors: Ji-Young Kim, Gyeonggi-do (KR); Na-Youn Park, Gyeonggi-do (KR); Jae-Hyoung Park, Gyeonggi-do (KR); Jung-Su Ha, Gyeonggi-do (KR); Gyu-Cheol Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/464,458

(22) PCT Filed: Nov. 23, 2017

(86) PCT No.: PCT/KR2017/013429
§ 371 (c)(1),
(2) Date: May 28, 2019

(87) PCT Pub. No.: WO2018/101676
PCT Pub. Date: Jun. 7, 2018

(65) Prior Publication Data
US 2019/0394383 A1    Dec. 26, 2019

(30) Foreign Application Priority Data

Nov. 29, 2016 (KR) .................. 10-2016-0160456

(51) Int. Cl.
*H04N 5/235* (2006.01)
*G03B 15/02* (2021.01)
(Continued)

(52) U.S. Cl.
CPC ........... *H04N 5/2354* (2013.01); *G03B 15/02* (2013.01); *H04N 5/2256* (2013.01); *H04N 5/2351* (2013.01); *H04M 1/0202* (2013.01)

(58) Field of Classification Search
CPC .. H04N 5/2354; H04N 5/2256; H04N 5/2351; H04N 5/232933; H04N 5/23206;
(Continued)

(56) References Cited

U.S. PATENT DOCUMENTS

2005/0281549 A1* 12/2005 Shih .................... G03B 7/08
396/57
2010/0020220 A1* 1/2010 Sugita ................ H04N 5/23219
348/333.01
(Continued)

FOREIGN PATENT DOCUMENTS

JP    2001-166230 A    6/2001
JP    2012-204953 A    10/2012
(Continued)

*Primary Examiner* — Yogesh K Aggarwal
(74) *Attorney, Agent, or Firm* — Cha & Reiter, LLC

(57) ABSTRACT

An electronic device according to various embodiments comprises a camera module, a communication module, and a processor electrically connected to the camera module and the communication module, wherein the processor acquires an exposure value for an image inputted using the camera module, acquires lighting control-related information from at least one lighting device on the basis of a network connected using the communication module, and can generate a signal for adjusting at least one piece of the lighting control-related information of the at least one lighting device on the basis of the exposure value and a preset lighting control-related information set value. In addition, other embodiments are possible.

13 Claims, 13 Drawing Sheets

(51) Int. Cl.
*H04N 5/225* (2006.01)
*H04M 1/02* (2006.01)

(58) Field of Classification Search
CPC ...... G03B 15/02; H04M 1/0202; H04M 1/02; H04M 1/725; H05B 47/10
See application file for complete search history.

(56) References Cited

U.S. PATENT DOCUMENTS

| | | | |
|---|---|---|---|
| 2013/0120636 A1* | 5/2013 | Baer | G03B 15/05 |
| | | | 348/335 |
| 2013/0271004 A1 | 10/2013 | Min et al. | |
| 2014/0160307 A1 | 6/2014 | Ganesh et al. | |
| 2014/0267803 A1* | 9/2014 | Shintani | H04N 5/23296 |
| | | | 348/208.2 |
| 2016/0127630 A1* | 5/2016 | Kitajima | H04N 5/2351 |
| | | | 348/370 |
| 2017/0206704 A1* | 7/2017 | Inoue | G06T 11/60 |
| 2017/0339770 A1 | 11/2017 | Kim et al. | |

FOREIGN PATENT DOCUMENTS

| | | |
|---|---|---|
| JP | 2014-197162 A | 10/2014 |
| KR | 10-2014-0122908 A | 10/2014 |
| KR | 10-2015-0095721 A | 8/2015 |
| KR | 10-2016-0000437 A | 1/2016 |
| KR | 10-2016-0064797 A | 6/2016 |

* cited by examiner (a)

(b)

ELECTRONIC DEVICE AND CONTROL METHOD THEREFOR

CROSS-REFERENCE TO RELATED APPLICATION(S)

This application is a National Phase Entry of PCT International Application No. PCT/KR2017/013429, which was filed on Nov. 23, 2017 and claims priority under 35U.S.C. § 119 of Korean Patent Application No. 10-2016-0160456, filed on Nov. 29, 2016, in the Korean Intellectual Property Office the disclosure of which is incorporated herein by reference in its entirety.

TECHNICAL FIELD

Various embodiments of the present disclosure relate to an electronic device for capturing an image by controlling a lighting device connected through wired or wireless communication and a control method of the electronic device.

BACKGROUND ART

In general, lighting systems have used light sources such as an incandescent lamp, a discharge lamp, a fluorescent lamp, etc., for home, sightseeing and industrial use. From among the above light sources, a resistive light source, such as an incandescent lamp, has low efficiency and generates heat, a discharge lamp incurs high costs and consumes high voltage, and a fluorescent lamp causes environmental problems due to the use of mercury.

Newer light sources for lighting systems including light emitting diodes (LEDs) which have many advantages such as high efficiency, diversity in color, and autonomy in design, have recently attracted a lot of attention.

Despite the advantages of some lighting systems, a lighting device is still controllable using a dedicated program or switch for the lighting device, causing inconvenience for a user. Although a technique for controlling a lighting device in association with a smartphone has been actively studied, there is a limitation when the user implements various lighting effects.

DETAILED DESCRIPTION OF THE INVENTION

Technical Problem

In order for the user to produce various lighting effects widely known while controlling a lighting device using an electronic device such as a smartphone, the user needs to control a light emission amount, a color temperature, etc., of each lighting device.

However, the user may experience inconvenience in capturing an image while controlling a light emission amount, a color temperature, etc., of each lighting device connected with the electronic device to produce various lighting effects.

Various embodiments of the present disclosure provide an electronic device for capturing an image by controlling a lighting device connected through wired or wireless communication and a control method of the electronic device.

Technical Solution

An electronic device according to an embodiment of the present disclosure may include a camera module, a communication module, and a processor electrically connected with the camera module and the communication module, in which the processor is configured to obtain an exposure value for an image that is inputted using the camera module, obtain lighting control-related information from at least one lighting device based on a connected network by using the communication module, and generate a signal for adjusting at least one of the lighting control-related information of the at least one lighting device based on the exposure value and a preset lighting control-related information setting value.

A control method of an electronic device including a camera module and a communication module according to an embodiment of the present disclosure may include obtaining an exposure value for an image inputted through the camera module, obtaining lighting control-related information from at least one lighting device by using the communication module, and generating a signal for adjusting at least one of the lighting control-related information of the at least one lighting device based on the exposure value and a preset lighting control-related information setting value.

A storage medium has stored therein instructions for executing a control method of an electronic device including a camera module and a communication module according to an embodiment of the present disclosure, in which the instructions are executed to obtain an exposure value for an image inputted through the camera module, obtain lighting control-related information from at least one lighting device by using the communication module, and generate a signal for adjusting at least one of the lighting control-related information of the at least one lighting device based on the exposure value and a preset lighting control-related information setting value.

Advantageous Effects

According to the present disclosure, an electronic device for capturing an image by controlling a lighting device connected through wired or wireless communication and a control method of the electronic device may be provided.

A control method of an electronic device including a camera module and a communication module according to an embodiment of the present disclosure may include obtaining an exposure value for an image inputted through the camera module, obtaining lighting control-related information from at least one lighting device by using the communication module, and generating a signal for adjusting at least one of the lighting control-related information of the at least one lighting device based on the exposure value and a preset lighting control-related information setting value, thereby setting a desired lighting state and capturing an image, and thus easily producing various preset lighting effects.

MODE FOR CARRYING OUT THE INVENTION

Figure 1A:
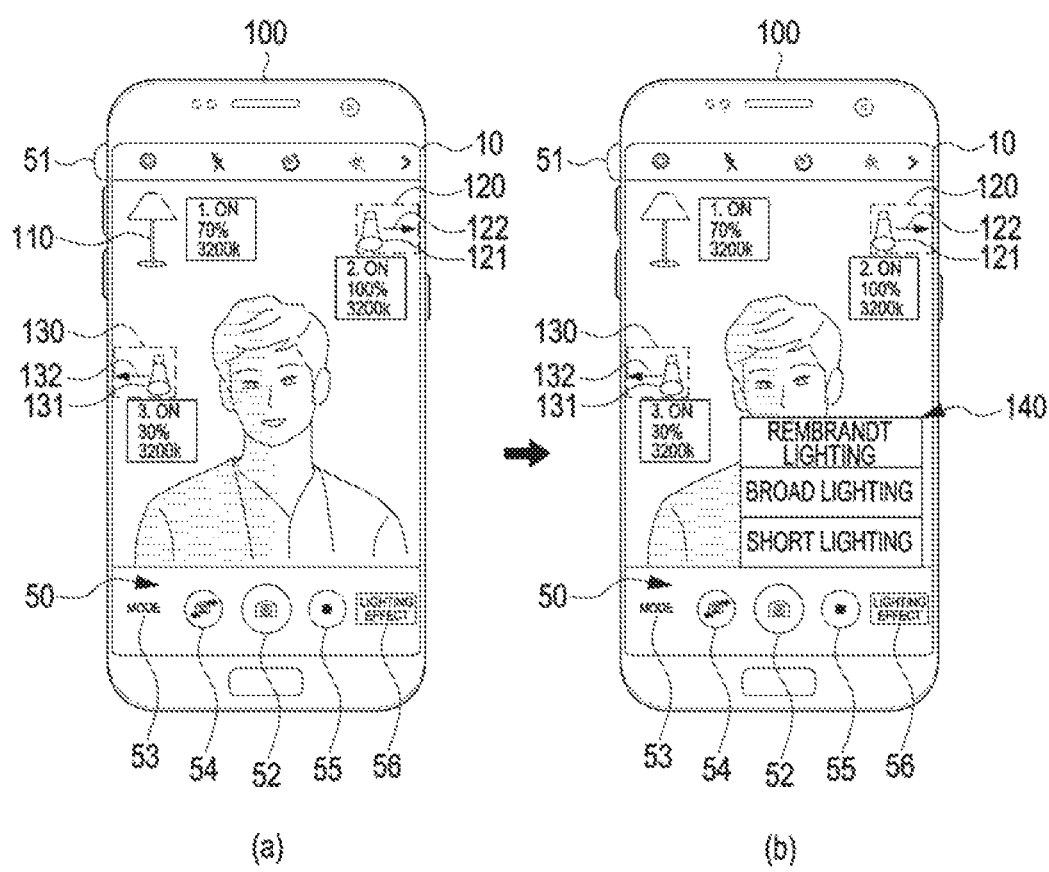
FIGS. 1A and 1B are views for describing a lighting system according to an embodiment of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B", "at least one of A and/or B", or "one or more of A and/or B" may include all possible combinations of together listed items. As used herein, such terms as "1st" and "$2^{nd}$", or "first" and "second" may be used to simply distinguish a corresponding component from another, and does not limit the components in other aspects (e.g., importance or order). When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for", "having the capacity to", "adapted to", "made to", "capable of", or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a medical equipment, a camera, or a wearable device. The wearable device may include at least one of an accessory type (e.g., a watch, a ring, a bracelet, an anklet, a necklace, a pair of glasses, contact lenses, a head-mounted device (HMD), etc.), a fabric or cloth-integrated type (e.g., electronic clothing, etc.), a body-attached type (e.g., a skin pad, a tattoo, etc.), a body implantable circuit. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic frame.

Figure 1B:
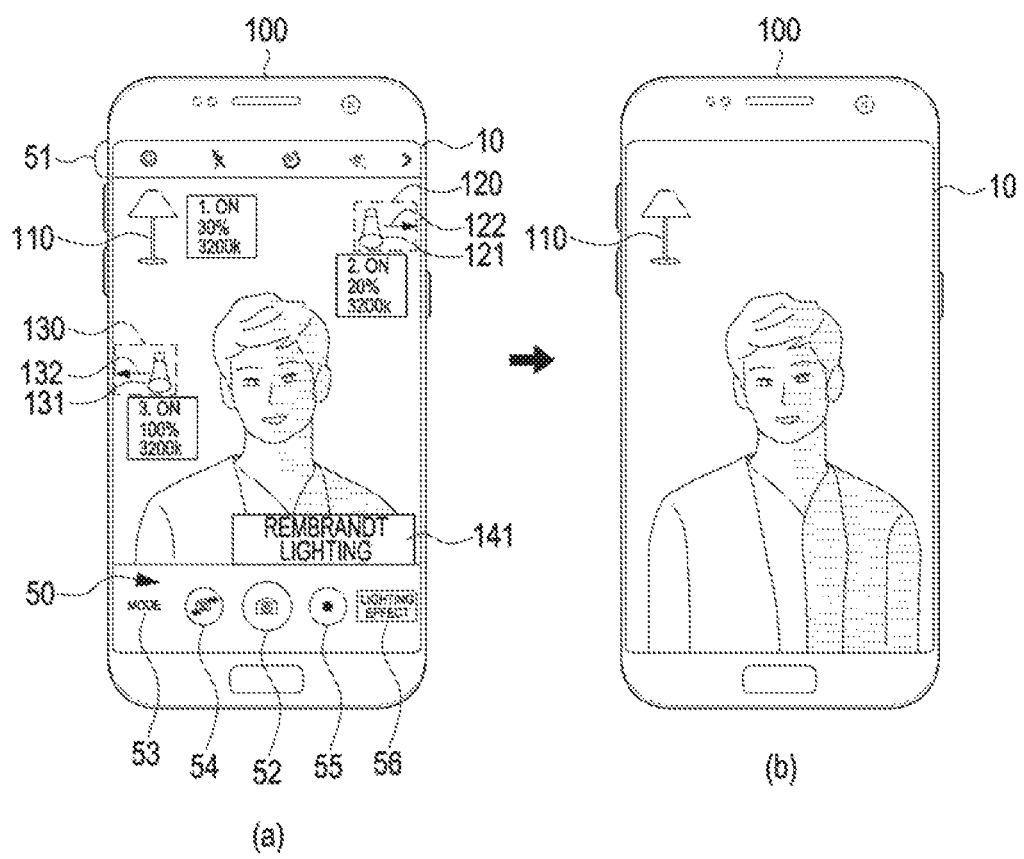

FIGS. 1A and 1B are views for describing a lighting system according to an embodiment of the present disclosure. According to an embodiment of the present disclosure, a lighting system may include a lighting device and an electronic device 100.

The electronic device 100 may control the lighting device in the lighting system. The electronic device 100 may be used as a lighting control device in the lighting system. The electronic device 100 may control on/off, color temperature, dimming, color sense, etc., of at least one lighting device. The electronic device 100 may include any control means that is directly/indirectly connected with the lighting device or the lighting system by using a wired/wireless network to control the lighting device or the lighting system.

The electronic device 100 may include a stationary device such as a digital TV or a PC, and a mobile device such as a smart phone, a tablet PC, or a laptop. The electronic device 100 may indirectly involve lighting control through another electronic device. The following description will be made assuming that the electronic device 100 is a mobile device. The lighting device may mean the lighting system or a lighting unit, i.e., a light-emitting unit, e.g., a light-emitting device (LED), as the case may be.

For the electronic device, the lighting device, and other electronic devices in the lighting system, a pairing process may be required therebetween depending on a communication protocol. The electronic device 100 may use firmware, an application, etc., for lighting control, and to this end, the firmware or application may be previously implemented in the electronic device 100 or downloaded from an external server for use in lighting device control.

The electronic device 100 may include a hardware configuration together with or separately from a software configuration to use the same for the lighting control.

Hereinbelow, the lighting device may be of at least one of a flat plate type, a bulb type, or a PAR type, or a combination thereof.

Referring to FIG. 1A, the electronic device 100 may display a user interface 50 including an image that is inputted through a camera module (not shown) upon execution of a camera function. For example, the user interface 50 may display various icons 51 for controlling photographing in an upper end of the display 10. For example, the user interface 50 may display a photographing icon 52, a mode switch icon 53, a first camera module-second camera module switch icon 54, a moving image capturing icon 55, and a lighting effect icon 56 in a lower end of the display 10. However, the configuration of the user interface 50 is not limited to this example.

Referring to FIG. 1A(a), the electronic device 100 may measure an exposure value for the image inputted through the camera module (not shown). The exposure value measured by the electronic device 100 is information related to a brightness of the input image, and may differ depending on, for example, an aperture value, a shutter speed, sensitivity, white balance, a metering mode, etc., of the electronic device 100.

The aperture value may mean, for example, a value indicating a degree to which an aperture (not shown) included in the camera module is opened. The lower the aperture value is, the higher the degree to which the aperture is opened is, such that the aperture may receive more light; the higher the aperture value is, the lower the degree to which the aperture is opened is, such that the aperture may receive less light.

The shutter speed may indicate, for example, a time for which light is irradiated to an imaging element (not shown) located in the camera module. As the shutter speed is higher, the imaging device may be exposed to light for a shorter time; as the shutter speed is lower, the imaging device may be exposed to light for a longer time.

The photographic sensitivity may indicate, for example, sensitivity at which the imaging device responds to light. As the photographic sensitivity is higher, the imaging device may sensitively respond to a small amount of light and reproduce an object included in the irradiated light; as the photographic sensitivity is lower, the imaging device may reproduce the object included in the irradiated light with a sufficient amount of light.

The white balance may be, for example, intended to correct color distortion occurring in a lighting device or light. The white balance may mean a function for correcting a signal generated by light incident to the imaging device to make a signal of light corresponding to a white object white.

The metering mode may mean, for example, a region of the object in which the electronic device 100 measures the amount of light. For example, the electronic device 100 may measure the amount of light from the entire input image or from a specific partial region of the input image.

The electronic device 100 may measure an exposure value of an image being inputted through the camera module. The user may also adjust the measured exposure value by adjusting the aperture value, the shutter speed, the photographic sensitivity, the white balance, the metering mode, etc. That is, in spite of the same amount of light inputted through the camera module, the user may obtain a desired exposure value by adjusting the above-described values.

Referring to FIG. 1A(a), the electronic device 100 may display on the display 10, a lighting device that may affect the exposure of an image input at a current position.

The electronic device 100 may be wiredly or wirelessly connected with the first through third lighting devices (110 through 130) according to a preset communication protocol. The electronic device 100 and the lighting devices 110 through 130 may exchange various types of data by communicating with one another. In this case, the lighting devices 110 through 130 may be one of Internet of things (IoT) devices. The IoT (or Internet of things) may refer to exchanging various information or data through Internet connection to not only conventional computing devices, but also things having no computing function, e.g., a sensor, a home appliance, a measurement device, etc., by using various communication methods (e.g., Bluetooth (BT), the Long-Term Evolution (LTE), Wireless Fidelity (WiFi), etc.).

For example, the electronic device 100 may deliver a current position of the electronic device 100, an exposure value measured by the electronic device 100, a direction the camera module (not shown) of the electronic device 100 faces, and so forth to the lighting devices 110 through 130.

According to an embodiment of the present disclosure, the electronic device 100 may identify a distance from or a position of an object included in the input image. For example, the electronic device 100 may measure the distance from the object simultaneously with or sequentially from measuring the exposure value of the object by using the camera module.

The lighting devices 110 through 130 may deliver data such as positions, amounts of light, color temperatures, on/off states, etc., of the lighting devices 110 through 130 to the electronic device 100. However, the present disclosure is not limited to this example. For example, for the lighting system including an IoT hub, the IoT hub may identify states and information of the lighting devices 110 through 130 in real time and share the states and the information with the electronic device 100.

Thus, the electronic device 100 may display, on the display 10, information about the lighting devices 110 through 130 which are located in a direction the camera module of the electronic device 100 faces, fall within a viewing angle range of a lens included in the camera module, and are located within a preset distance that may affect an exposure value of the image input through the camera module.

According to an embodiment of the present disclosure, the electronic device 100 may display lighting control-related information of the lighting device 110, adjacent to the lighting device 110 included in the input image. For example, the electronic device 100 may determine that the lighting device 110 is located in a position where a shape similar to the lighting device 110 is detected, or in a position having a brightness value that differs from those of surroundings of the position by a specific value or greater. However, the present disclosure is not limited to this example.

The electronic device 100 may also display lighting control-related information of the lighting devices 120 and 130 located adjacent to the current position of the electronic device 100, although the lighting devices 120 and 130 are not included in the input image. When the electronic device 100 displays the lighting devices 120 and 130 located adjacent to the current position of the electronic device 100, the lighting devices 120 and 130 may be displayed using icons 121 and 131 indicating the lighting devices 120 and 130 and icons 122 and 132 in arrow shapes indicating directions in which the lighting devices 120 and 130 are located.

For example, when an object has a separate electronic device, the electronic device 100 may obtain position information of the other electronic device of the object by communicating with the other electronic device to identify a position of the object.

Thus, the electronic device 100 may identify distances and position relationships among the electronic device 100, the object, and the lighting devices 110 through 130.

Referring to FIG. 1A(b), the electronic device 100 may display a lighting effect list 140 showing a plurality of lighting effects on the display 10 based on a signal input of selecting the lighting effect icon 56. The lighting effect list 140 may include various lighting effects such as Rembrandt lighting, broad lighting, short lighting, split lighting, butterfly lighting, backlighting, non-shadow lighting, etc.

According to an embodiment of the present disclosure, to produce a lighting effect that is similar or identical to a selected lighting effect based on a signal input of selecting one from various lighting effects of the lighting effect list 140, the electronic device 100 may control the lighting devices 110 through 130 to modify the lighting control-related information of the lighting devices 110 through 130 displayed on the display 10.

Generally, the amount of light may decrease inversely proportionally to the square of a distance. Thus, the electronic device 100 may change the amounts of light of the lighting devices 110 through 130 based on distances between the lighting devices 110 through 130 and the electronic device 100, color temperatures of the lighting devices 110 through 130, etc.

Referring to FIG. 1B(a), the electronic device 100 may adjust the lighting control-related information of the lighting devices 110 through 130 displayed on the display 10 to produce the lighting effect similar to the selected lighting effect. For example, in a case where a Rembrandt lighting effect 141 is selected, the electronic device 100 may increase the amount of light of the third lighting device 130 and reduce the amount of light of the second lighting device 120.

More specifically, when the first lighting device 110 currently emits light with a light emission amount of 70%, the second lighting device 120 currently emits light with a light emission amount of 100%, and the third lighting device 130 currently emits light with a light emission amount of 30%, the electronic device 100 may adjust a light emission amount based on the user's selection of the Rembrandt lighting effect 141 such that the first lighting device 110 emits light at 30%, the second lighting device 120 emits light at 20%, and the third lighting device 130 emits light at 100%.

When necessary, the electronic device 100 may control the first through third lighting devices 110 through 130 to change color temperatures thereof together with the light emission amounts.

According to an embodiment of the present disclosure, the user may modify again the lighting control-related information adjusted by the electronic device 100 based on the selected lighting effect. For example, when the user selects the second lighting device 120 displayed on the display 10 by touching the second lighting device 120, the electronic device 100 may display a user interface for adjusting a light emission amount, a color temperature, etc., in the form of a pop-up.

Referring to FIG. 1B(b), the electronic device 100 may capture the input image, store the same, and display the same on the display 10, based on a signal input of selecting the photographing icon 52.

According to various embodiments of the present disclosure, the electronic device 100 may process the image inputted through the camera module before modifying the lighting control-related information of the lighting devices 110 through 130 based on the signal input of selecting a lighting effect, to display the selected lighting effect in advance.

For example, based on selection of the Rembrandt lighting effect 141, the electronic device 100 may produce and display a shadow effect that is similar to application of the Rembrandt lighting effect 141 to an image displayed on the display 10. The electronic device 100 may produce a shadow effect based on previously stored lighting control-related information related to the Rembrandt lighting effect 141, an exposure value of the image inputted through the camera module, and the lighting control-related information received from the lighting devices 110 through 130.

More specifically, the electronic device 100 may detect a face and a body from the image displayed on the display 10. The electronic device 100 may display an image effect that is similar to a shadow in the right sides of the face and the body based on the Rembrandts lighting effect 141. When necessary, the electronic device 100 may apply and display an image effect such that the left sides of the face and the body are displayed bright.

According to another embodiment of the present disclosure, the electronic device 100 may adjust the lighting control-related information of the lighting devices 110 through 130 based on a signal input of selecting the photographing icon 52. That is, the electronic device 100 may change and then display the lighting control-related information of the lighting devices 110 through 130 displayed on the display 10 based on a signal input of selecting the lighting effect icon 56, and upon selection of the photographing icon 52, may adjust the lighting control-related information of the lighting devices 110 through 130.

The electronic device 100 may adjust the lighting control-related information of the lighting devices 110 through 130 to a pre-photographing state previous to photographing, after termination of photographing.

According to an embodiment of the present disclosure, the electronic device 100 may analyze the image inputted through the camera module to classify the currently input image. For example, when a face is detected from the input image, the electronic device 100 may classify the currently input image as a portrait image. When an illumination of the currently input image is less than or equal to a preset value, the electronic device 100 may classify the currently input image as a night scene image.

According to an embodiment of the present disclosure, when determining the currently input image as a portrait image, the electronic device 100 may display information about the lighting devices 110 through 130 located near the electronic device 100 on the display 10 and display the lighting effect icon 56.

According to various embodiments of the present disclosure, the lighting system may use a plurality of street lamps, a plurality of vehicle lights, etc. That is, the electronic device 100 may temporarily establish the lighting system by connecting to a street lamp on the street or to a plurality of vehicles, through wired/wireless communication, and may adjust the street lamp or a headlight of the vehicle.

According to another embodiment of the present disclosure, the electronic device 100 may establish the lighting system by interworking with a plurality of mobile electronic devices (e.g., a smartphone, a tablet PC, etc.).

As such, according to the above-described lighting system, the user may capture an image including an effect that is identical or similar to a preset lighting effect by using the electronic device 100.

Figure 2:
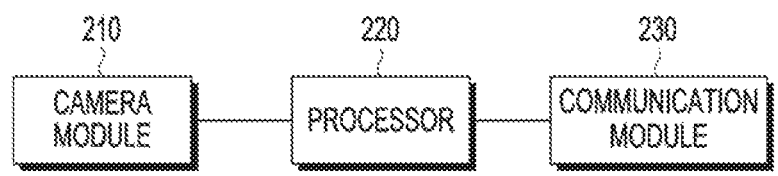
FIG. 2 is a block diagram of an electronic device according to an embodiment.

FIG. 2 is a block diagram of an electronic device according to an embodiment.

Referring to FIG. 2, the electronic device 100 may include a camera module 210, a processor 220, or a communication module 230. However, the electronic device 100 may be implemented with more or less elements than those illustrated in FIG. 2. For example, the electronic device 100 may include input modules (e.g., a physical key, a proximity sensor, a biometric sensor, etc.), a power supply unit, and so forth.

The camera module 210 may perform a general digital camera function by including a lens unit, an image sensor, etc., to photograph an object.

The camera module 210 may include an illumination sensor for illumination measurement, a distance sensor for measurement of a distance from an object, etc., to properly set the photography mode. The camera module 210 may be arranged on the front surface of the electronic device 100 (e.g., a surface on which the display is arranged) and the rear surface of the electronic device 100 (e.g., a surface opposite to the front surface), respectively, or a plurality of camera modules may be arranged on the front surface or the rear surface.

The camera module 210 according to an embodiment of the present disclosure may receive light inputted through the lens via the image sensor. The camera module 210 may calculate an exposure value of the currently input image based on the amount of light received in the image sensor, under control of the processor 220. However, the present disclosure is not limited to this example. The camera module 210 may include a separate sensor for exposure value measurement.

The processor 220 may control multiple hardware or software components connected to the processor 230 by driving an operating system (OS) or an application program, and perform processing and operations with respect to various data.

The processor 220 according to an embodiment may display a user interface for a camera function, previously stored in a memory (not shown), on a display (not shown). However, the present disclosure is not limited to this example. For example, the processor 220 may receive a user interface for a camera function from an external other electronic device or a server through the communication module 230 and display the received user interface on the display.

The processor 220 may receive an electrical image signal (e.g., raw format data) obtained by the camera module 210 and perform various image processing (e.g., color interpolation, edge enhancement, noise cancellation, etc.) with respect to the same to make the electrical image signal look real, and may process the electrical image signal suitably for characteristics of the screen of the display and store the processed electrical image signal in the memory.

The processor 220 according to an embodiment of the present disclosure may calculate an exposure value of the currently input image based on the amount of light inputted through the camera module 210. The processor 220 may adjust an aperture value, a shutter speed, etc., for the camera module 210 based on the calculated exposure value. The processor 220 may control the currently input image to be exposed properly by adjusting sensitivity, white balance, etc.

According to an embodiment of the present disclosure, the processor 220 may control the display to display information about a lighting device to be displayed together with the user interface for the camera function on the display.

For example, the processor 220 may control the display to display lighting control-related information of a lighting device included in the currently input image on the display, based on position information of the lighting device, received through the communication module 230. The processor 220 may control the display to display the lighting control-related information on the display based on a viewing angle of a lens included in the camera module 210, a position of the electronic device 100, a direction the camera module 210 faces, a position of the lighting device, etc.

The processor 220 may also control the display to display lighting control-related information of a lighting device located adjacent to a viewing angle of the currently input image on the display, although the lighting device is not included in the currently input image.

The communication module 230 may establish communication with another electronic device or lighting device under control of the processor 220. The communication module 230 may receive information related to a state of the other electronic device or a state of a lighting device and transmit information related to a state of the electronic device 100, under control of the processor 220.

For example, the communication module 230 may receive lighting control-related information such as position, light emission amount, color temperature, etc., of the lighting device from the lighting device, under control of the processor 220.

Figure 3A:
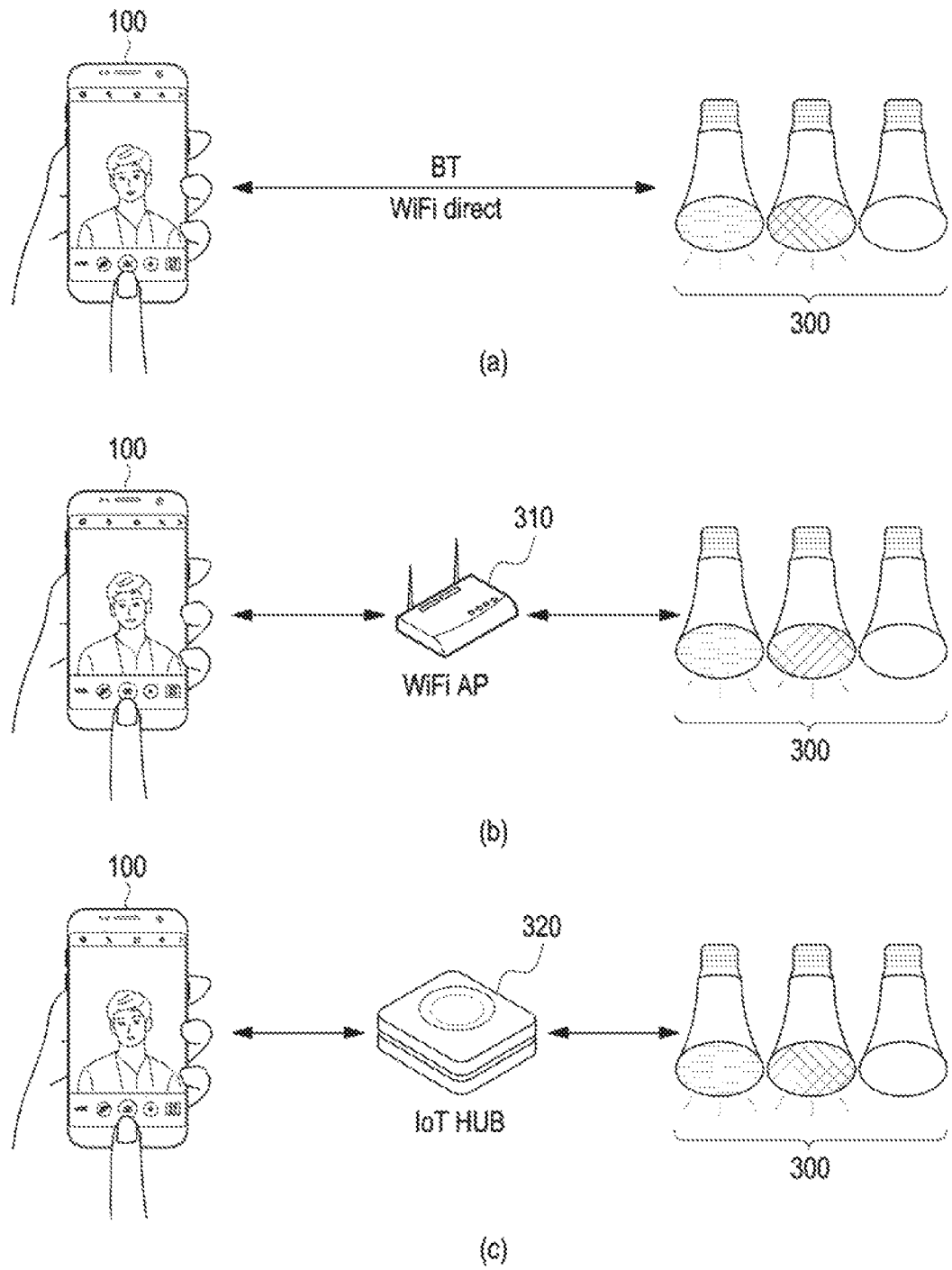
FIGS. 3A and 3B are views for describing relationships among an electronic device, a lighting device, and other electronic devices included in a lighting system, according to an embodiment of the present disclosure.
Figure 3B:
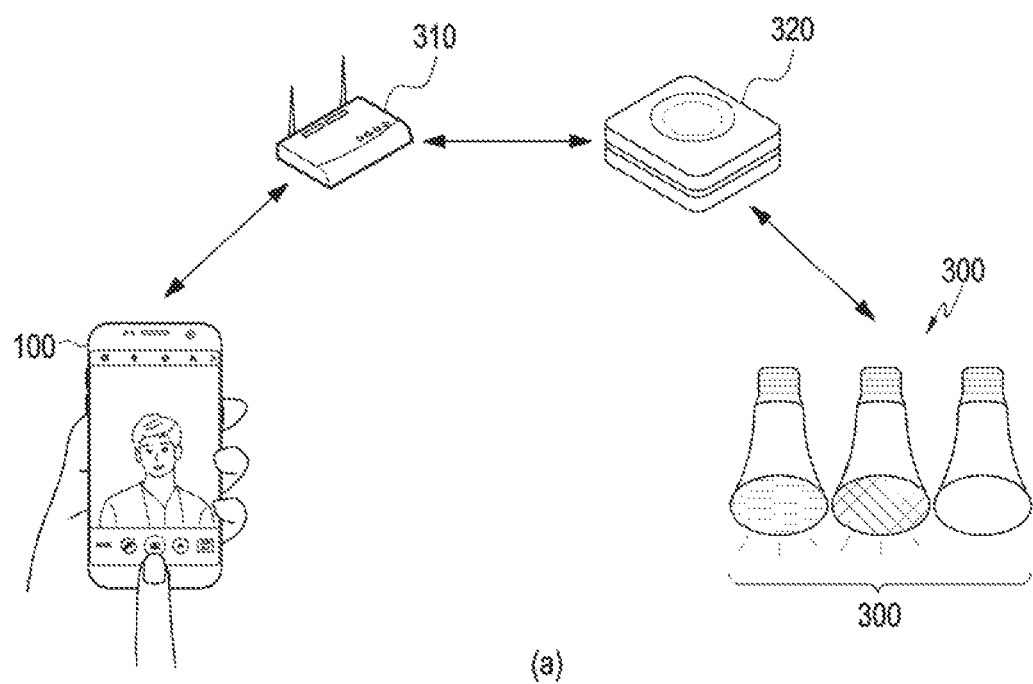
Figure 3B:
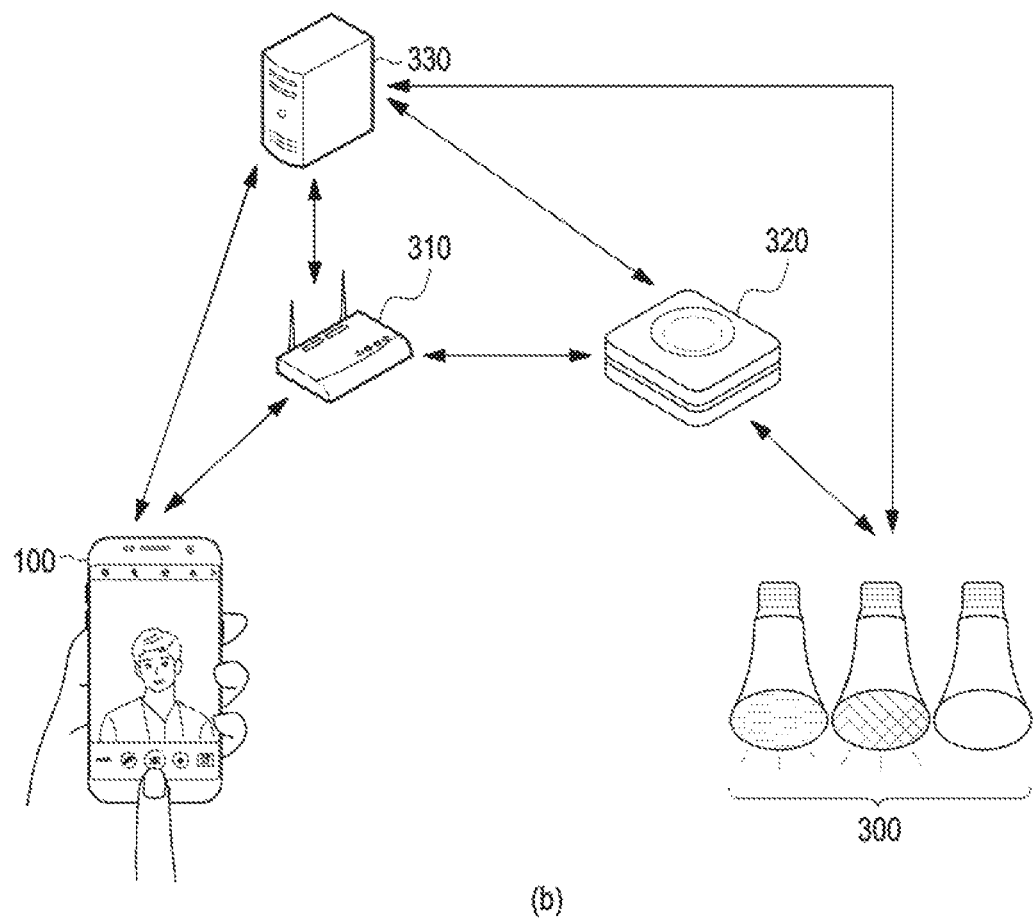

FIGS. 3A and 3B are views for describing relationships among an electronic device, a lighting device, and other electronic devices included in a lighting system, according to an embodiment of the present disclosure.

Referring to FIG. 3A(a), the electronic device 100 may establish a direct communication relationship with a lighting device 300. The lighting device 300 may include the lighting devices 110 through 130 of FIGS. 1A and 1B. For example, the electronic device 100 may establish communication using a communication method such as BT, WiFi Direct, etc., and exchange data.

Referring to FIG. 3A(b), the electronic device 100 may establish communication with the lighting device 300 by using a WiFi access point (AP) 310. In this case, the electronic device 100 may request the lighting device 300 to transmit lighting control-related information thereto through the WiFi AP 310. The lighting device 300 may deliver the current lighting control-related information to the electronic device 100 through the WiFi AP 310.

Referring to FIGS. 3A(c), 3B(a), and 3B(b), the electronic device 100 may be connected with the lighting device 300 by using various communication methods.

Referring to FIG. 3A(c), the electronic device 100 may set up communication with the lighting device 300 or other electronic devices (not shown) having different communication methods by using an IoT hub 320. That is, the IoT hub 320 may serve as an intermediary among the different communication methods.

In this case, the electronic device 100 may request the IoT hub 320 to transmit the lighting control-related information of the lighting device 300 thereto, for example, by using BT communication. The IoT hub 320 may transmit the request of the electronic device 100 to the lighting device 300, for example, by using ZigBee communication.

According to an embodiment of the present disclosure, the IoT hub 320 may have a function of managing an IoT device such as the lighting device 300.

Referring to FIG. 3B(a), the electronic device 100 may request the WiFi AP 310 to transmit the lighting control-related information of the lighting device 300 thereto by using WiFi communication. The WiFi AP 310 may transmit the request of the electronic device 100 to the IoT hub 320 which may then transmit the request of the electronic device 100 to the lighting device 300 by using BT communication.

Referring to FIG. 3B(b), the electronic device 100, the WiFi AP 310, the IoT hub 320, etc., may receive data regarding the lighting device 300 from a server 330 and generate a signal for controlling the lighting device 300.

For example, the server 330 may share lighting control-related information with the lighting device 300 in real time. The electronic device 100 may receive the lighting control-related information from the server 330 by using cellular communication. Likewise, the WiFi AP 310 and the IoT hub 320 may receive the lighting control-related information of the lighting device 300 from the server 330. The electronic device 100 may request the lighting device 300 to perform desired lighting control-related information adjustment by using lighting control-related information received in real time, without separately requesting the lighting device 300 to transmit lighting control-related information.

As such, a lighting device according to an embodiment of the present disclosure may be implemented in various forms.

Figure 4:
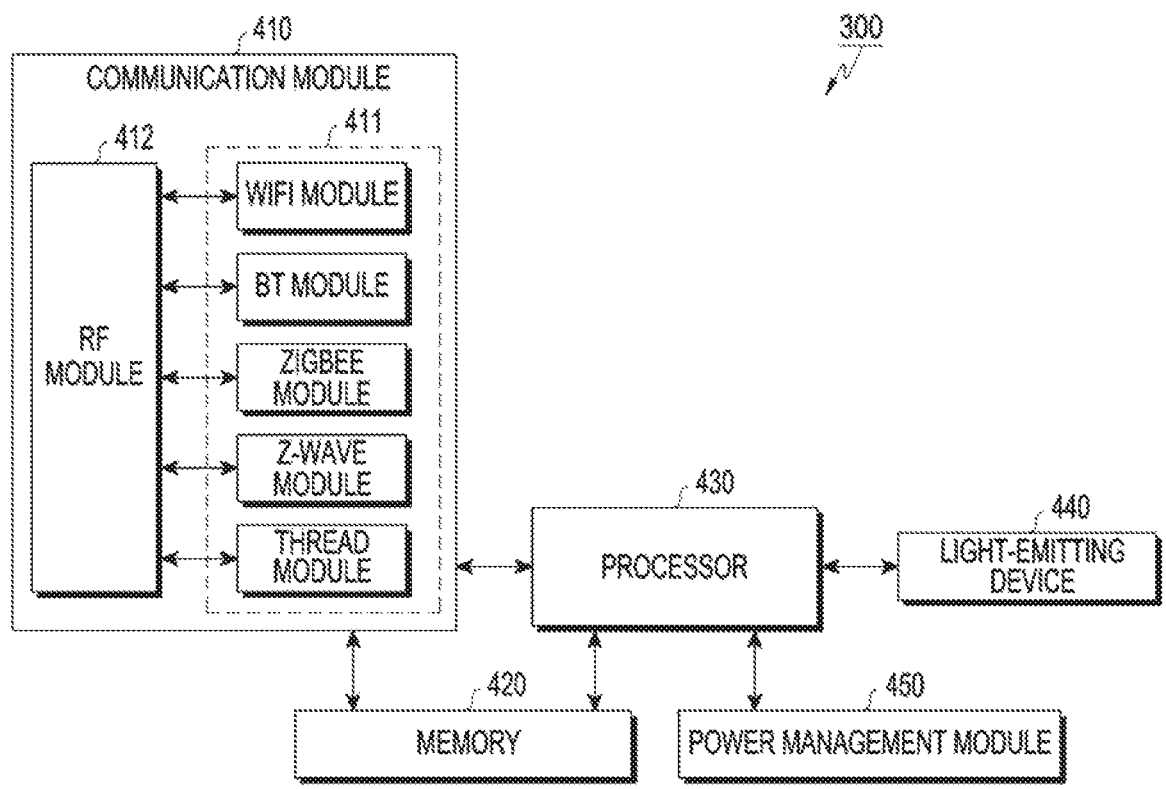
FIG. 4 illustrates a structure of a lighting device according to various embodiments of the present disclosure.

FIG. 4 illustrates a structure of the lighting device 300 according to various embodiments of the present disclosure.

Referring to FIG. 4, the lighting device 300 may include a communication module (or a wireless communication circuit) 410, a light-emitting device 440, a power management module 450, a memory 420, or a processor (or a control circuit) 430.

The communication module 410 may include a radio frequency (RF) module 412 for transmitting and receiving an RF signal and at least one of short-range communication modules 411 such as a WiFi module, a BT module, a ZigBee module, a Z-wave module, and a thread module.

While it is illustrated in FIG. 4 that the short-range communication modules 411 share the one RF module 412, at least one of the short-range communication modules 411 may perform transmission and reception of the RF signal through a separate RF module according to an embodiment of the present disclosure. The communication module 410 may include at least one of long-range communication modules such as an LTE module, an LTE advance (LTE-A) module, a code division multiple access (CDMA) module, a wideband CDMA (WCDMA) module, a universal mobile telecommunications system (UMTS) module, a wireless broadband (WiBro) module, a global system for mobile communications (GSM) module, and so forth. The communication module 410 may communicate with an IoT hub (e.g., the IoT hub 320), the electronic device 100, etc.

The light-emitting device 440 may emit light. The light-emitting device 440 may be various devices or organic materials that emit light, such as a light-emitting diode (LED), a laser diode, an incandescent lamp, a fluorescent lamp, a light-emitting organic material, etc. The light-emitting device is not limited to the above-described embodiment, and may include a new device or organic materials according to technical development.

The light-emitting device 440 may emit light substantially omnidirectionally. Herein, in a case where light is emitted substantially omnidirectionally, it may mean that the light is emitted in a plurality of directions toward an unspecific point rather than toward a specific point like a pointer. The direction in which the light is emitted may be a circular direction including the light-emitting device 440 in the center, or a vertical line direction or a horizontal line direction depending on a shape of a light-transmitting portion provided in the light-emitting device 440.

The power management module 450 may control power for driving the lighting device 300. The power management module 450 may continuously supply external power supplied from a power generator to the lighting device 300, and supply power supplied from a battery to the lighting device 300. The power management module 450 may separately include a hardware module or a software module for a low-energy operation of the lighting device 300.

The memory 420 may include an internal memory or an external memory.

The internal memory may include, for example, at least one of a volatile memory (e.g., dynamic random access memory (DRAM), static RAM (SRAM), synchronous dynamic RAM (SDRAM), etc.), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment of the present disclosure, an internal memory may be a solid state drive (SSD).

The external memory may include flash drive, for example, compact flash (CF), secure digital (SD), micro-SD, mini-SD, extreme Digital (xD), or a memory stick. The external memory may be functionally connected with the lighting device 300 through various interfaces. According to an embodiment of the present disclosure, the lighting device 300 may further include a storage device (or a storage medium) such as a hard drive.

The memory 420 may store information related to a pattern and/or a frequency for light emission of the lighting device 300.

The memory 420 may include identification information (e.g., a media access control (MAC) address, a name, a byname, a network identification (ID), etc.) of the lighting device 300 and identification information (e.g., a MAC address, a name, a byname, a network ID, etc.) of an IoT hub (e.g., the IoT hub 320) connected with the lighting device 300.

The processor 430 (or a control circuit) may perform the overall operation of the lighting device 300. The processor 430 may be electrically connected with the communication module 410 and the light-emitting device 440 and share position information and lighting control-related information of the lighting device 300 with the IoT hub (e.g., the IoT hub 320).

According to an embodiment of the present disclosure, the processor 430 may control the light-emitting device 440 to control a light emission amount, a color temperature, a light emission duration, etc., based on a signal received from the electronic device 100.

An electronic device according to various embodiments of the present disclosure may include a camera module, a communication module, and a processor electrically connected with the camera module and the communication module, in which the processor is configured to obtain an exposure value for an image that is inputted using the camera module, obtain lighting control-related information from at least one lighting device based on a connected network by using the communication module, and generate a signal for adjusting at least one of the lighting control-related information of the at least one lighting device based on the exposure value and a preset lighting control-related information setting value.

Figure 5:
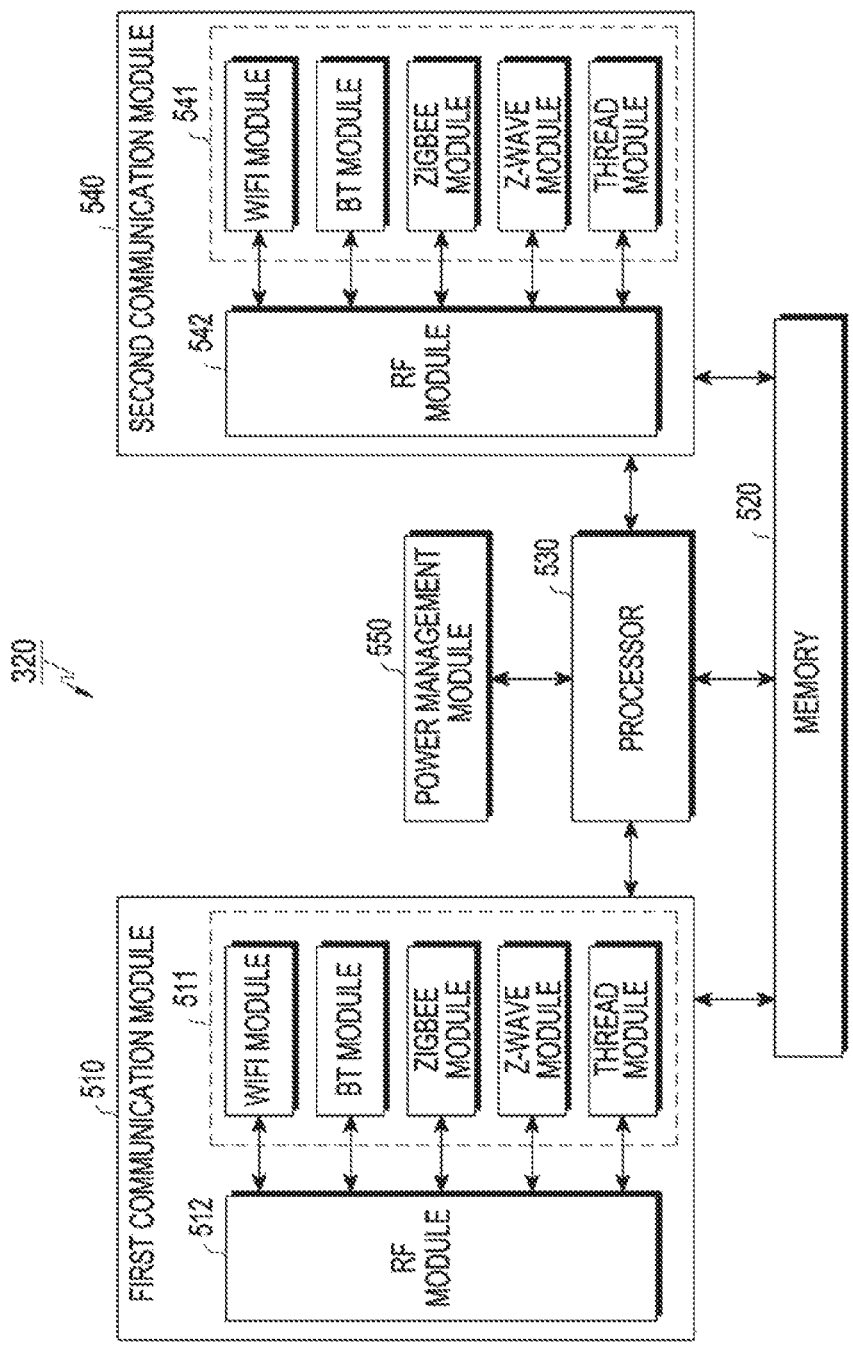
FIG. 5 illustrates a structure of an Internet of things (IoT) hub according to an embodiment of the present disclosure.

FIG. 5 illustrates a structure of the IoT hub 320 according to an embodiment of the present disclosure.

Referring to FIG. 5, the IoT hub 320 may include a first communication module (or a first wireless communication circuit) 510, a second communication module (or a second wireless communication circuit) 540, a power management module 550, a memory 520, or a processor (or a control circuit) 530.

The first communication module 510 and the second communication module 540 may include RF modules 512 and 542 for transmitting and receiving an RF signal and short-range communication modules 511 and 541, respectively. Each of the first communication module 510 and the second communication module 540 may further include a long-range module.

Examples of the short-range communication modules 511 and 541 and the long-distance communication module may be replaced with examples of the short-range communication module 411 and the long-distance communication module of the lighting device 300 of FIG. 4, and thus will not be described in detail.

The first communication module 510 may communicate with the lighting device (e.g., the lighting device 300), and the second communication module 520 may communicate with the electronic device 100. In another embodiment of the present disclosure, one of the first communication module 510 and the second communication module 520 may communicate with both the lighting device (e.g., the lighting device 300) and the electronic device 100.

The power management module 550 may control power for driving the IoT hub 320. The power management module 550 may continuously supply the external power supplied from the power generator to the IoT hub 320, and supply the power supplied from the battery to the IoT hub 320.

The memory 520 may include an internal memory or an external memory. An example of the memory 520 will be replaced with an example of the memory 420 of the lighting device 300 of FIG. 4, and thus will not be described in detail.

The processor (or a control circuit) 530 may perform the overall operation of the IoT hub 320.

For example, the processor 530 may control the RF modules 512 and 542 to transmit and receive a signal or data of the electronic device 100 to and from the electronic device 100 by using a first communication method and to transmit and receive a signal or data to and from the lighting device (e.g., the lighting device 300) by using a second communication method.

The processor 530 may store information about other IoT devices including the lighting device (e.g., the lighting device 300) in the memory 520 and when necessary, transmit the information to the electronic device 100 or another electronic device including the server.

Figure 6A:
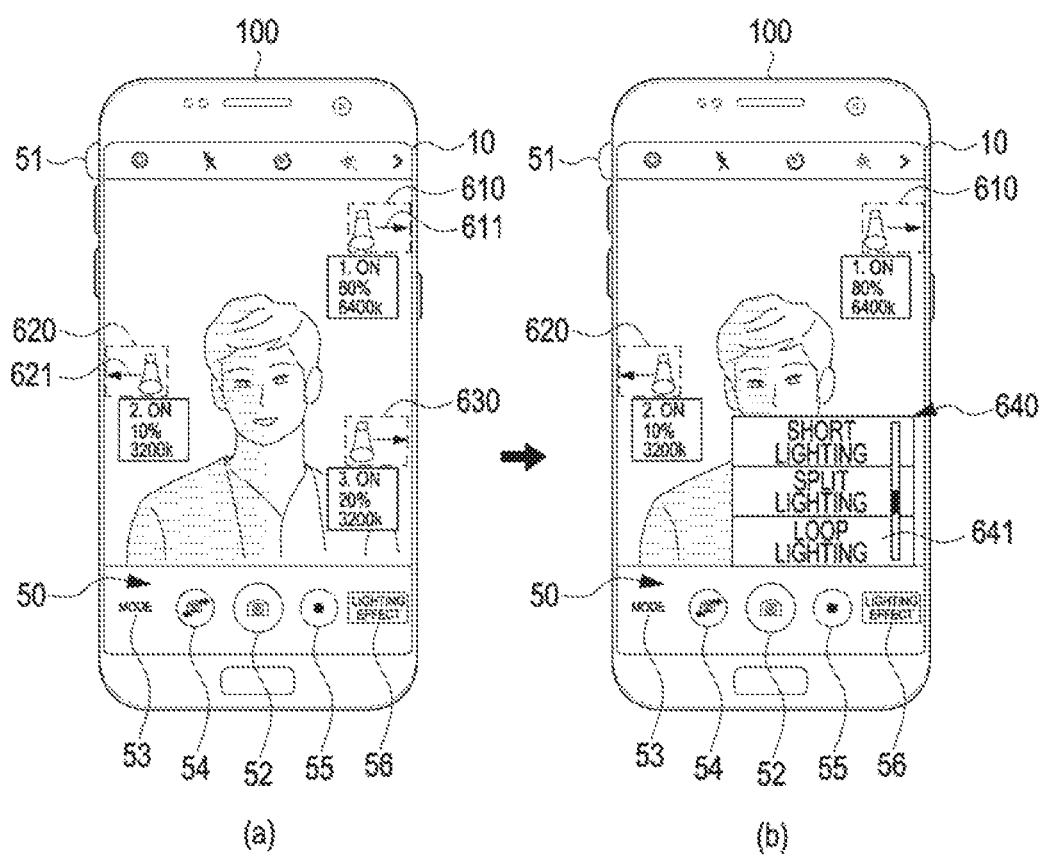
FIGS. 6A and 6B are views for describing another example in which an electronic device according to an embodiment of the present disclosure changes lighting control-related information of a lighting device based on a selected lighting effect.
Figure 6B:
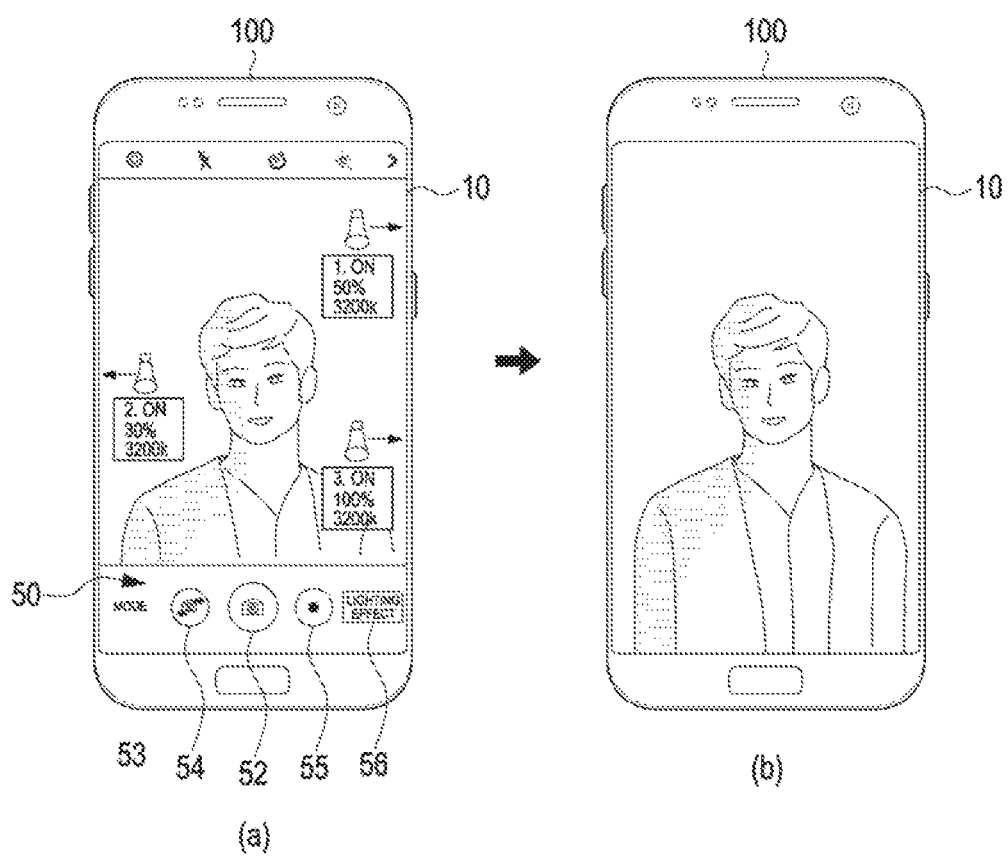

FIGS. 6A and 6B are views for describing another example in which an electronic device according to an embodiment of the present disclosure changes lighting control-related information of a lighting device based on a selected lighting effect.

Referring to FIG. 6A(a), the electronic device 100 may display, on the display 10, a lighting device that may affect the exposure of an image inputted at a current position.

The electronic device 100 may be wiredly or wirelessly connected with first through third lighting devices 610 through 630 according to a preset communication protocol. The electronic device 100 may deliver the current position of the electronic device 100, an exposure value measured by the electronic device 100, a direction the camera module (not shown) of the electronic device 100 faces, and so forth to the lighting devices 610 through 630.

The lighting devices 610 through 630 may deliver data such as positions, amounts of light, color temperatures, on/off states, etc., of the lighting devices 610 through 630 to the electronic device 100. However, the present disclosure is not limited to this example. For example, for the lighting system including an IoT hub (e.g., the IoT hub 320), the IoT hub (e.g., the IoT hub 320) may identify states and information of the lighting devices 610 through 630 in real time and share the states and the information with the electronic device 100.

Thus, the electronic device 100 may display on the display 10, information about the lighting devices 610 through 630 which are located adjacent to a direction the camera module of the electronic device 100 faces and are located within a preset distance that may affect an exposure value of the image inputted through the camera module.

According to an embodiment of the present disclosure, the electronic device 100 may display lighting control-related information of the lighting device 610, adjacent to the lighting device 610 included in the input image. The electronic device 100 may also display lighting control-related information of the lighting devices 620 and 630 located adjacent to the current position of the electronic device 100, although the lighting devices 120 and 130 are not included in the input image. When the electronic device 100 displays the lighting devices 620 and 630 located adjacent to the current position of the electronic device 100, directions in which the lighting devices 620 and 630 are located may be indicated using arrow icons 611 and 621.

Referring to FIG. 6A(b), the electronic device 100 may display a lighting effect list 640 related to a plurality of lighting effects on the display 10 based on a signal input of selecting the lighting effect icon 56. The lighting effect list 640 may include various lighting effects such as short lighting, split lighting, loop lighting, butterfly lighting, backlighting, non-shadow lighting, etc.

According to an embodiment of the present disclosure, to produce a lighting effect that is similar or identical to a selected lighting effect based on a signal input of selecting one from among various lighting effects of the lighting effect list 640, the electronic device 100 may control the lighting devices 610 through 630 to modify the lighting control-related information of the lighting devices 610 through 630 displayed on the display 10.

Referring to FIGS. 6A(b) and 6B(a), the electronic device 100 may adjust the lighting control-related information of the lighting devices 610 through 630 displayed on the display 10 to produce the lighting effect similar to the selected lighting effect. For example, in a case where the loop lighting effect 641 is selected, the electronic device 100 may reduce the amount of light of the first lighting device 610 and increase the amounts of light of the second lighting device 620 and the third lighting device 630.

More specifically, when the first lighting device 610 currently emits light with a light emission amount of 80%, the second lighting device 620 currently emits light with a light emission amount of 10%, and the third lighting device 630 currently emits light with a light emission amount of 20%, the electronic device 100 may adjust a light emission amount in response to the user selecting the Rembrandt lighting effect 641, such that the first lighting device 610 emits light at 50%, the second lighting device 620 emits light at 30%, and the third lighting device 630 emits light at 100%. The electronic device 100 may adjust a color temperature of the first lighting device 610 from 6400K to 3200K.

According to an embodiment of the present disclosure, the user may modify again the lighting control-related information adjusted by the electronic device 100 based on the selected lighting effect. For example, the user may select the third lighting device 630 displayed on the display 10 and then further adjust the amount of light, a color temperature, etc. thereof.

Referring to FIG. 6B(b), the electronic device 100 may capture the input image, store the same, and display the same on the display 10, based on a signal input of selecting the photographing icon 52. According to an embodiment of the present disclosure, the electronic device 100 may adjust the lighting control-related information of the lighting devices 610 through 630 to a pre-photographing state previous to photographing, after termination of photographing. However, the present disclosure is not limited to this example.

The electronic device 100 may maintain the lighting control-related information of the lighting devices 610 through 630 to a photographing state.

Figure 7:
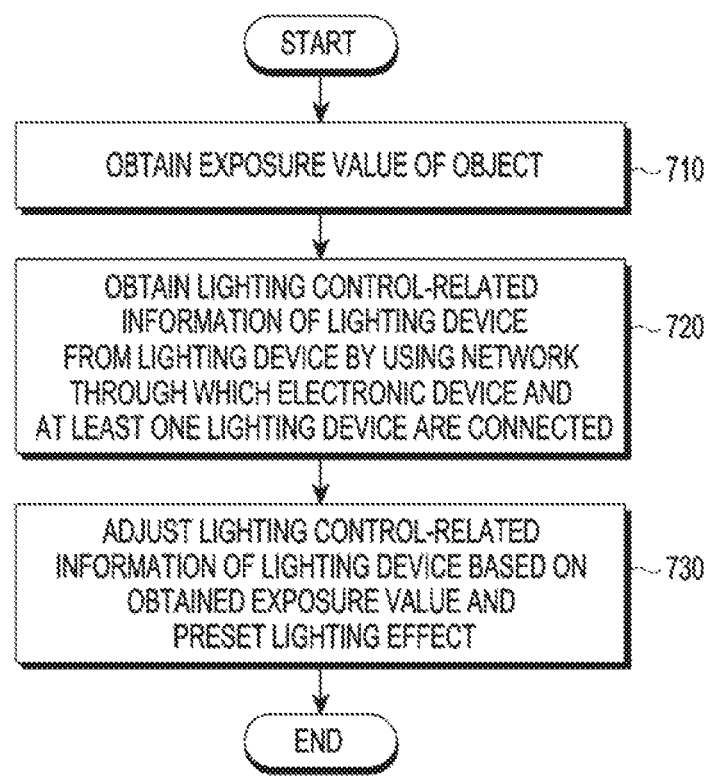
FIG. 7 is a flowchart of a process in which an electronic device according to an embodiment of the present disclosure adjusts lighting control-related information of a lighting device.

FIG. 7 is a flowchart of a process in which an electronic device according to an embodiment of the present disclosure adjusts lighting control-related information of a lighting device.

In operation 710, the electronic device 100 may obtain an exposure value of an object. According to an embodiment of the present disclosure, the electronic device 100 may measure an exposure value for an image inputted through the lens included in the camera module. The electronic device 100 may change an aperture value, a shutter speed, sensitivity, etc., based on the measured exposure value for proper exposure of the currently input image.

However, the present disclosure is not limited to this example. For example, in a photographing mode where the user changes an aperture value, a shutter speed, sensitivity, etc., the electronic device 100 may display excess, shortage, or appropriateness of the current exposure based on the aperture value, the shutter speed, the sensitivity, etc. changed by the user.

In operation 720, the electronic device 100 may obtain lighting control-related information of a lighting device from the lighting device by using a network through which the electronic device 100 and at least one lighting device are connected to each other. In operation 720, the electronic device 100 may receive lighting control-related information from the at least one lighting device connected thereto by using wired or wireless communication. The lighting device may be, for example, one of IoT devices. In this case, the lighting device may set up communication with the electronic device 100 by using an IoT hub device, etc., or directly communicate with the electronic device 100 without a separate device.

The lighting control-related information according to an embodiment of the present disclosure may include, for example, on/off information, light emission amount information, color temperature information, etc., of the lighting device.

In operation 730, the electronic device 100 may adjust the lighting control-related information of the lighting device based on the obtained exposure value and a preset lighting effect. In operation 730, the electronic device 100 may adjust the lighting control-related information of the lighting device based on the obtained exposure value and a previously stored lighting effect.

A control method of an electronic device including a camera module and a communication module according to an embodiment of the present disclosure may include obtaining an exposure value for an image inputted through the camera module, obtaining lighting control-related information from at least one lighting device by using the communication module, and generating a signal for adjusting at least one of the lighting control-related information of the at least one lighting device based on the exposure value and a preset lighting control-related information setting value.

Figure 8:
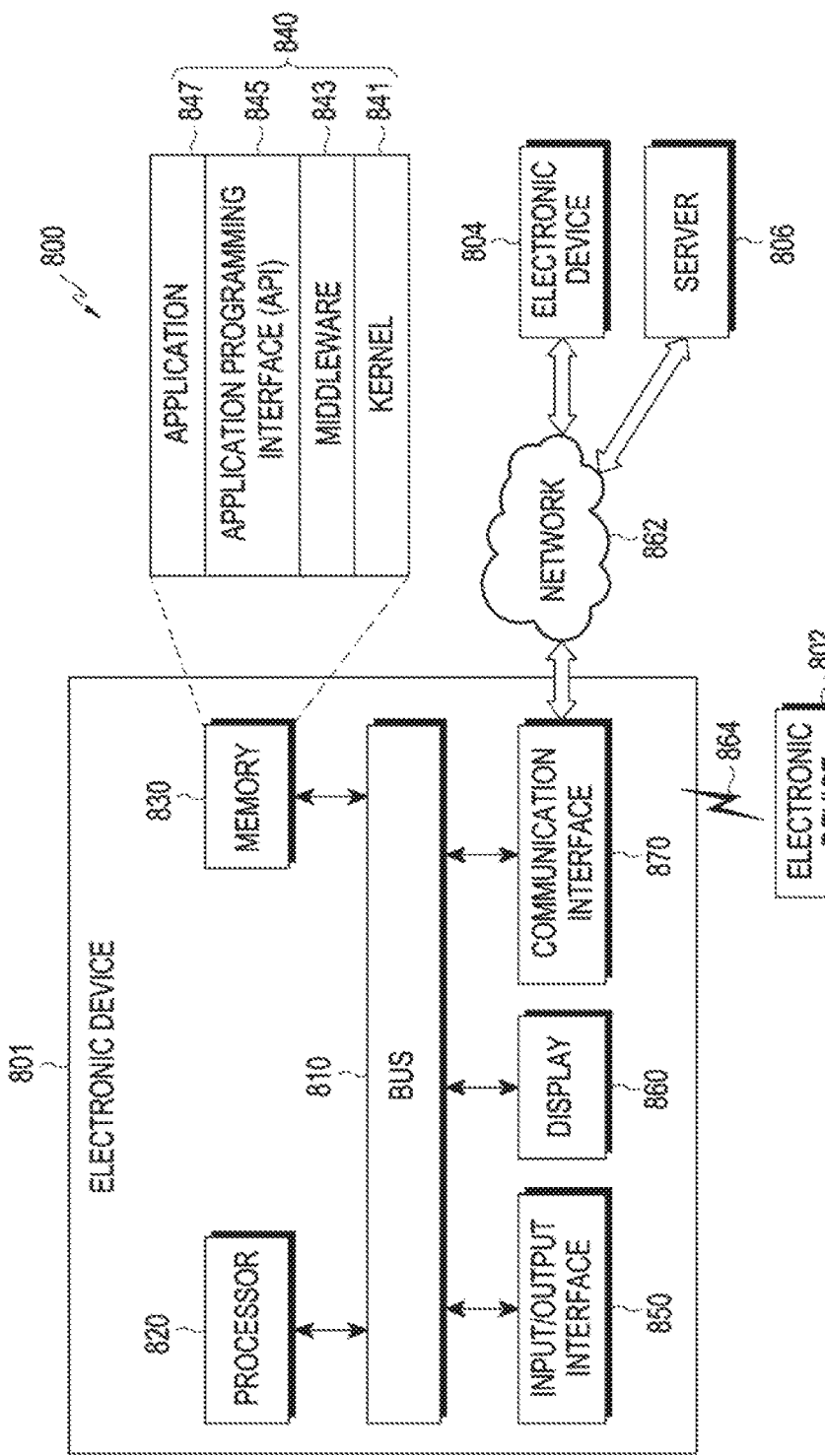
FIG. 8 illustrates an electronic device in a network environment according to various embodiments of the present disclosure.

Referring to FIG. 8, an electronic device 801 in a network environment 800 according to various embodiments of the present disclosure is disclosed. The electronic device 801 may include the electronic device 100 illustrated in FIG. 1. The electronic device 801 may include a bus 810, a processor 820, a memory 830, an input/output (I/O) interface 850, a display 860, and a communication interface 870. According to some embodiments, the electronic device 801 may omit at least one of the foregoing elements or may further include other elements. The bus 810 may include a circuit for connecting, e.g., the elements 810 to 870 and delivering communication (e.g., a control message or data) between the elements 810 to 870. The processor 820 may include one or more of a central processing unit (CPU), an application processor (AP), or a communication processor (CP). The processor 820 performs, for example, operations or data processing for control and/or communication of at least one other elements of the electronic device 801.

The memory 830 may include a volatile and/or nonvolatile memory. The memory 830 may store, for example, instructions or data associated with at least one other elements of the electronic device 801. According to an embodiment of the present disclosure, the memory 830 may store software and/or a program 840. The program 840 may include at least one of, for example, a kernel 841, middleware 843, an application programming interface (API) 845, and/or an application program (or "application") 847, or the like. At least some of the kernel 841, the middleware 843, or the API 845 may be referred to as an operating system (OS). The kernel 841 may control or manage, for example, system resources (e.g., the bus 810, the processor 820, the memory 830, etc.) used to execute operations or functions implemented in other programs (e.g., the middleware 843, the API 845, or the application program 847). The kernel 841 provides an interface through which the middleware 843, the API 845, or the application program 847 accesses separate components of the electronic device 801 to control or manage the system resources.

The middleware 843 may work as an intermediary for allowing, for example, the API 845 or the application program 847 to exchange data in communication with the kernel 841. In addition, the middleware 843 may process one or more task requests received from the application program 847 based on priorities. For example, the middleware 843 may give a priority for using a system resource (e.g., the bus 810, the processor 820, the memory 830, etc.) of the electronic device 801 to at least one of the application programs 847, and may process the one or more task requests. The API 845 is an interface used for the application 847 to control a function provided by the kernel 841 or the middleware 843, and may include, for example, at least one interface or function (e.g., an instruction) for file control, window control, image processing or character control. The I/O interface 850 may deliver, for example, an instruction or data input from a user or another external device to other component(s) of the electronic device 801, or output an instruction or data received from other component(s) of the electronic device 801 to a user or another external device.

The display 860 may include, for example, a liquid crystal display (LCD), a light emitting diode (LED) display, an organic light emitting diode (OLED) display, a microelectromechanical system (MEMS) display, or an electronic paper display. The display 860 may, for example, display various contents (e.g., a text, an image, a video, an icon, and/or a symbol, etc.) to users. The display 860 may include a touchscreen, and receive a touch, a gesture, or a proximity or a hovering input, for example, by using an electronic pen or a part of the body of a user. The communication interface 870 establishes communication between the electronic device 801 and an external device (e.g., the first external electronic device 802, the second external electronic device 804, or the server 806). For example, the communication interface 870 may be connected to a network 862 through wireless communication or wired communication to communicate with an external device (e.g., the second external electronic device 804 or the server 806).

Wireless communication may include a cellular communication protocol using at least one of, for example, LTE, LTE-A, CDMA, WCDMA, UMTS, WiBro, GSM, or the like. According to an embodiment, the wireless communication may include at least one of WiFi, BT, Bluetooth Low Energy (BLE), ZigBee, near field communication (NFC), magnetic secure transmission (MST), RF, or a body area network (BAN). According to an embodiment, the wireless communication may include a global navigation satellite system (GNSS). The GNSS may include, for example, at least one of a global positioning system (GPS), a global navigation satellite system (GLONASS), a Beidou navigation satellite system ("Beidou"), or Galileo, the European global satellite based navigation system. Hereinbelow, "GPS" may be used interchangeably with "GNSS". The wired communication may include, for example, at least one of a universal serial bus (USB), a high definition multimedia interface (HDMI), a recommended standard (RS)-232, power line communication, a plain old telephone service (POTS), or the like. The network 862 may include a telecommunications network, for example, at least one of a computer network (e.g., a local area network (LAN) or a wide area network (WAN)), Internet, or a telephone network.

Each of the first external electronic device 802 and the second external electronic device 804 may be a device of the same type as or a different type than the electronic device 801. According to various embodiments of the present disclosure, some or all of operations performed by the electronic device 801 may be performed in another electronic device or a plurality of electronic devices (e.g., the electronic device 802 or 804 or the server 806). According to an embodiment of the present disclosure, when the electronic device 801 has to perform a function or a service automatically or at a request, the electronic device 801 may request another device (e.g., the electronic devices 802 or 804 or the server 806) to perform at least some functions associated with the function or the service, instead of or in addition to executing the function or the service. The other electronic device (e.g., the electronic device 802 or 804 or the server 806) may execute the requested function or additional function and deliver the execution result to the electronic device 801. The electronic device 801 may then process or further process the received result to provide the requested function or service. To that end, a cloud computing, distributed computing, or client-server computing technology may be used, for example.

Figure 9:
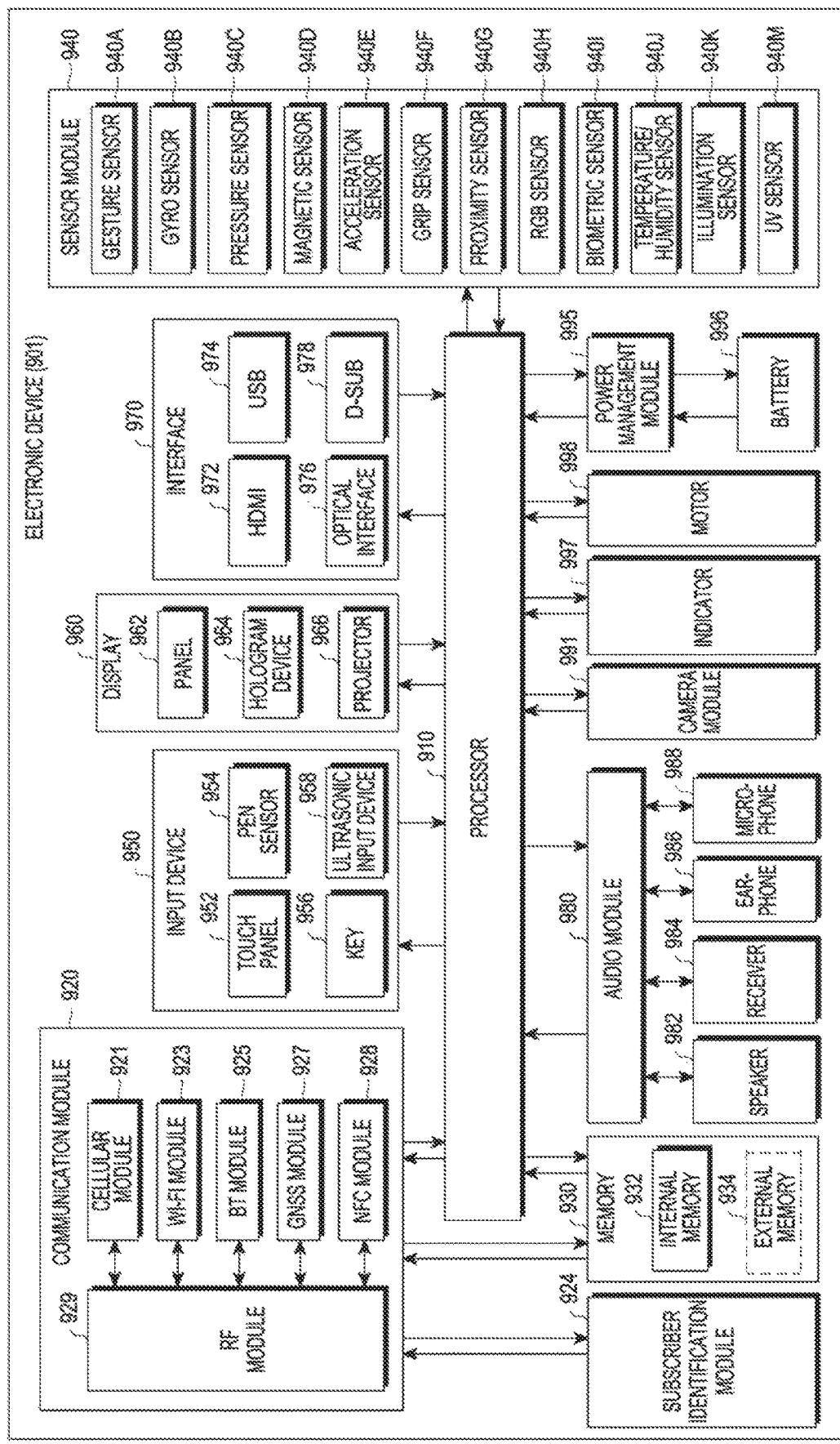
FIG. 9 is a block diagram of an electronic device according to various embodiments of the present disclosure.

FIG. 9 is a block diagram of an electronic device 901 according to various embodiments of the present disclosure. The electronic device 901 may include the entire electronic device 100 illustrated in FIG. 1 and the electronic device 801 illustrated in FIG. 8, or a part of the electronic device 100 or 801. The electronic device 901 may include one or more processors (e.g., application processors (APs)) 910, a communication module 920, a subscriber identification module (SIM) 924, a memory 930, a sensor module 940, an input device 950, a display 960, an interface 970, an audio module 980, a camera module 991, a power management module 995, a battery 996, an indicator 997, and a motor 998. The processor 910, for example, controls multiple hardware or software components connected to the processor 910 by driving an operating system (OS) or an application program, and performs processing and operations with respect to various data. The processor 910 may be implemented with, for example, a system on chip (SoC). According to an embodiment of the present disclosure, the processor 910 may include a graphic processing unit (GPU) and/or an image signal processor. The processor 910 may include at least some of the elements (e.g., the cellular module 921) illustrated in FIG. 9. The processor 910 loads an instruction or data received from at least one of the other elements (e.g., a non-volatile memory) into a volatile memory to process the instruction or data, and stores result data in the non-volatile memory.

The communication module 920 may have a configuration that is the same as or similar to the communication interface 870. The communication module 920 may include, for example, the cellular module 921, a WiFi module 923, a Bluetooth (BT) module 925, a GNSS module 927, an NFC module 928, and a radio frequency (RF) module 929. The cellular module 921 may provide, for example, a voice call, a video call, a text service, or an Internet service over a communication network. According to an embodiment, the cellular module 921 identifies and authenticates the electronic device 901 in a communication network by using the SIM 924 (e.g., a SIM card). According to an embodiment, the cellular module 921 may perform at least one of functions that may be provided by the processor 910. According to an embodiment, the cellular module 921 may include a communication processor (CP). According to some embodiment, at least some (e.g., two or more) of the cellular module 921, the WiFi module 923, the BT module 925, the GNSS module 927, or the NFC module 928 may be included in one integrated chip (IC) or IC package. The RF module 929 may, for example, transmit and receive a communication signal (e.g., an RF signal). The RF module 929 may include, for example, a transceiver, a power amplifier module (PAM), a frequency filter, a low noise amplifier (LNA), or an antenna. According to another embodiment, at least one of the cellular module 921, the WiFi module 923, the BT module 925, the GNSS module 927, or the NFC module 928 may transmit and receive an RF signal through the separate RF module. The SIM 924 may, for example, include a card including a SIM or an embedded SIM, and may include unique identification information (e.g., an integrated circuit card identifier (ICCID) or subscriber information (e.g., an international mobile subscriber identity (IMSI)).

The memory 930 (e.g., the memory 830) may, for example, include an internal memory 932, or an external memory 934. The internal memory 932 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory, or a solid state drive (SSD)). The external memory 934 may further include flash drive, for example, compact flash (CF), secure digital (SD), micro-SD, mini-SD, extreme Digital (xD), a multi-media card (MMC), or a memory stick. The external memory 934 may be functionally or physically connected with the electronic device 901 through various interfaces.

The sensor module 940 measures physical quantity or senses an operation state of the electronic device 901 to convert the measured or sensed information into an electric signal. The sensor module 940 may, for example, include at least one of a gesture sensor 940A, a gyro sensor 940B, a pressure sensor 940C, a magnetic sensor 940D, an acceleration sensor 940E, a grip sensor 940F, a proximity sensor 940G, a color sensor 940H (e.g., red/green/blue (RGB) sensor), a biometric sensor 940I, a temperature/humidity sensor 940J, an illumination sensor 940K, or a ultraviolet (UV) sensor 940M. Additionally or alternatively, the sensor module 940 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 940 may further include a control circuit for controlling at least one sensor included therein. In some embodiment, the electronic device 901 may further include a processor configured to control the sensor module 940 as part of or separately from the processor 910, to control the sensor module 940 during a sleep state of the processor 910.

The input device 950 may include, for example, a touch panel 952, a (digital) pen sensor 954, a key 956, or an ultrasonic input device 958. The touch panel 952 may use, for example, at least one of a capacitive type, a resistive type, an IR type, or an ultrasonic type. The touch panel 952 may further include a control circuit. The touch panel 952 may further include a tactile layer to provide tactile reaction to the user. The (digital) pen sensor 954 may include a recognition sheet which is a part of the touch panel 252 or a separate recognition sheet. The key 256 may also include a physical button, an optical key, or a keypad. The ultrasonic input device 958 senses ultrasonic waves generated by an input means through a microphone (e.g., the microphone 988) and checks data corresponding to the sensed ultrasonic waves.

The display 960 (e.g., the display 860) may include a panel 962, a hologram device 964, a projector 966, and/or a control circuit for controlling them. The panel 962 may be, for example, implemented to be flexible, transparent, or wearable. The panel 962 may be configured with the touch panel 952 in one module. According to an embodiment, the panel 962 may include a pressure sensor (or a "force sensor") capable of measuring a strength of a pressure by a user's touch. The pressure sensor may be implemented integrally with the touch panel 952 or may be implemented as one or more sensors separate from the touch panel 952. The hologram device 964 may show a stereoscopic image in the air by using interference of light. The projector 966 may display an image onto a screen through projection of light. The screen may be positioned, for example, inside or outside the electronic device 901. The interface 970 may include, for example, an HDMI 972, a USB 974, an optical interface 976, or a D-subminiature (D-sub) 978. The interface 970 may be included, for example, in the communication interface 870 illustrated in FIG. 8. Additionally or alternatively, the interface 970 may include, for example, a mobile high-definition link (MHL) interface, an SD/multi-media card (MMC) interface, or an Infrared Data Association (IrDA) interface.

The audio module 980 may bi-directionally convert sound and an electric signal. At least some element of the audio module 980 may be included, for example, in the I/O interface 845 illustrated in FIG. 8. The audio module 980 may process sound information inputted or outputted, for example, through the speaker 982, the receiver 984, the earphone 986, or the microphone 988. The camera module 991 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 995, for example, manages power of the electronic device 901. According to an embodiment, the power management module 995 may include a power management integrated circuit (PMIC), a charger IC, or a battery fuel gauge. The PMIC may have a wired and/or wireless charging scheme. The wireless charging scheme may include, for example, a magnetic-resonance type, a magnetic induction type, and an electromagnetic type, and may further include an additional circuit for wireless charging, for example, a coil loop, a resonance circuit, or a rectifier. The battery gauge may measure, for example, the remaining capacity of the battery 996 or the voltage, current, or temperature of the battery 996 during charging. The battery 996 may include, for example, a rechargeable battery and/or a solar battery.

The indicator 997 displays a particular state, for example, a booting state, a message state, or a charging state, of the electronic device 901 or a part thereof (e.g., the processor 910). The motor 998 may convert an electric signal into mechanical vibration or generate vibration or a haptic effect. The electronic device 901 may include a device for supporting the mobile TV (e.g., a GPU) to process media data according to a standard such as digital multimedia broadcasting (DMB), digital video broadcasting (DVB), or MediaFlo™. Each of the foregoing elements described herein may be configured with one or more components, names of which may vary with a type of the electronic device. In various embodiments, some components of the electronic device (e.g., the electronic device 901) may be omitted or may further include other elements, and some of the components may be coupled to form one entity and identically perform functions of the components before being coupled.

Figure 10:
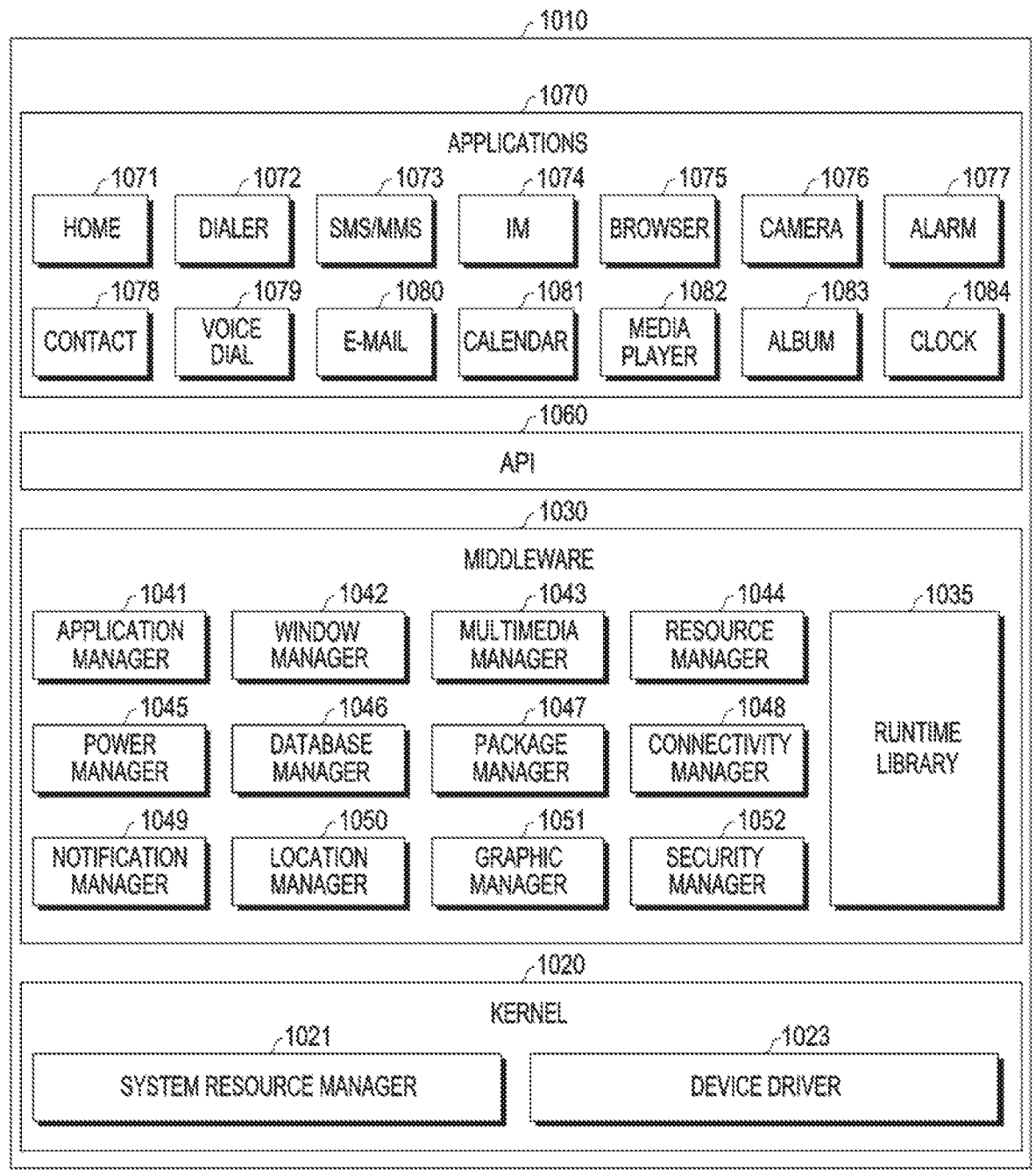
FIG. 10 is a block diagram of a programming module according to various embodiments.

FIG. 10 is a block diagram of a programming module according to various embodiments. According to an embodiment, a programming module 1010 (e.g., the program 840) may include an OS for controlling resources associated with an electronic device (e.g., the electronic device 100, 801, or 901) and/or various applications (e.g., the application program 847) executed on the OS. The OS may include Android™, iOS™, Windows™, Symbian™, Tizen™, or Bada™ Referring to FIG. 10, the programming module 1010 may include a kernel 1020 (e.g., the kernel 841), middleware 1030 (e.g., the middleware 843), an application programming interface (API) 1060 (e.g., the API 845), and/or an application 1070 (e.g., the application program 847). At least a part of the programming module 1010 may be preloaded on an electronic device or may be downloaded from an external device (e.g., the electronic device 802 or 804, or the server 806).

The kernel 1020 may include, for example, a system resource manager 1021 and/or a device driver 1023. The system resource manager 1021 may perform control, allocation, retrieval of system resources, and so forth. According to an embodiment, the system resource manager 1021 may include a process management unit, a memory management unit, or a file system management unit. The device driver 1023 may include, for example, a display driver, a camera driver, a Bluetooth driver, a shared memory driver, a USB driver, a keypad driver, a WiFi driver, an audio driver, or an inter-process communication (IPC) driver. The middleware 1030 may, for example, provide functions that the application 1070 commonly requires or provide various functions to the application 1070 through the API 1060 to allow the application 1070 to use a limited system resource in an electronic device. According to an embodiment, the middleware 1030 may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, or a security manager 1052.

The runtime library 1035 may include, for example, a library module that a compiler uses to add a new function through a programming language while the application 1070 is executed. The runtime library 1035 performs input/output management, memory management, or calculation function processing. The application manager 1041 manages, for example, a life cycle of the applications 1070. The window manager 1042 manages a graphic user interface (GUI) resource used in a screen. The multimedia manager 1043 recognizes a format necessary for playing media files and performs encoding or decoding on a media file by using a codec appropriate for a corresponding format. The resource manager 1044 manages a source code or a memory space of the applications 1070. The power manager 1045, for example, manages a battery or power and provides power information necessary for an operation of the electronic device. According to an embodiment, the power manager 1045 may operate with basic input/output system (BIOS). The database manager 1046, for example, generates, searches, or changes a database used for at least one application among the applications 1070. The package manager 1047 manages the installation or update of an application distributed in a package file format.

The connectivity manager 1048, for example, manages a wireless connection. The notification manager 1049 provides an event, e.g., an arriving message, an appointment, proximity notification, etc. The location manager 1050 manages, for example, location information of an electronic device. The graphic manager 1051 manages, for example, a graphic effect to be provided to a user or a user interface relating thereto. The security manager 1052 provides, for example, system security or user authentication. According to an embodiment, the middleware 1030 may include a telephony manager for managing a voice or video call function of the electronic device or a middleware module forming a combination of functions of the above-described components. According to an embodiment, the middleware 1030 provides a module specified for each type of an OS. The middleware 1030 may delete some of existing elements or add new elements dynamically. The API 1060 may be provided, for example, as a set of API programming functions with a different configuration according to the OS. In the case of Android or iOS, for example, one API set may be provided by each platform, and in the case of Tizen, two or more API sets may be provided.

The application 1070 may include one or more applications capable of providing a function, for example, a home application 1071, a dialer application 1072, a short messaging service/multimedia messaging service (SMS/MMS) application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, a clock application 1084, a health care application (e.g., an application for measuring an exercise amount, a blood sugar, etc.), or an environmental information application (e.g., an application for providing air pressure, humidity, or temperature information or the like). According to an embodiment, the application 1070 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 1070 may include an application (e.g., device health care application of mobile medical equipment) designated according to an attribute of the external electronic device. According to an embodiment, the application 1070 may include an application received from the external electronic device. The at least a part of the programming module 1010 may be implemented (e.g., executed) by software, firmware, hardware (e.g., the processor 910), or a combination of two or more of them, and may include, for example, modules, programs, routines, sets of instructions, or processes for performing one or more functions.

A storage medium has stored therein instructions for executing a control method of an electronic device including a camera module and a communication module according to an embodiment of the present disclosure, in which the instructions are executed to obtain an exposure value for an image inputted through the camera module, obtain lighting control-related information from at least one lighting device by using the communication module, and generate a signal for adjusting at least one of the lighting control-related information of the at least one lighting device based on the exposure value and a preset lighting control-related information setting value.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include, for example, an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 830) in the form of a programming module. When the instructions are executed by a processor (for example, the processor 820), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a camera module;
a display;
a communication module; and
a processor electrically connected with the camera module, the display and the communication module,
wherein the processor is configured to:
control the display to display a preview image inputted through the camera module;
obtain an exposure value for the preview image;
obtain lighting control-related information from at least one lighting device through a network connected by using the communication module;
control the display to display the lighting control-related information obtained from the at least one lighting device, in response to identifying that a face is detected from the preview image;
in response to a selection of a lighting effect, control the display to display the preview image to which an image effect corresponding to the selected lighting effect is applied; and
generate a signal for adjusting at least one piece of the lighting control-related information of the at least one lighting device based on the exposure value and a preset lighting control-related information setting value corresponding to the selected lighting effect, in response to a photographing signal input.

2. The electronic device of claim 1, wherein the lighting control-related information of the at least one lighting device includes an active state of the at least one lighting device, an inactive state of the at least one lighting device, position information of the at least one lighting device, a direction the at least one lighting device faces, an amount of light of the at least one lighting device, a color of the at least one lighting device, or a color temperature of the at least one lighting device.

3. The electronic device of claim 1, wherein the lighting control-related information setting value includes information about whether the at least one lighting device is activated or deactivated, a position value of the at least one lighting device, a direction the at least one lighting device faces, a light amount value of the at least one lighting device, a color value of the at least one lighting device, or a color temperature value of the at least one lighting device.

4. The electronic device of claim 1, wherein the processor is configured to:
control the display to display lighting control-related information of a lighting device located within a preset distance from the electronic device, and
control the display to display the lighting control-related information of the lighting device located within the preset distance to be included in the preview image.

5. The electronic device of claim 1, wherein the processor is configured to:
control the display to display icons indicating a position and a direction of a lighting device located within a preset distance from the electronic device and the lighting control-related information of the lighting device located within the preset distance, when the lighting device located within the preset distance is not directly displayed in a photographic viewing angle (composition) of the camera module.

6. The electronic device of claim 1, wherein the processor is configured to:
after capturing an image based on the photographing signal input,
generate a signal for changing the adjusted at least one piece of the lighting control-related information into the at least one piece of the lighting control-related information in a state previous to the adjustment.

7. The electronic device of claim 1, wherein the processor is configured to:
after capturing an image based on the photographing signal input,
generate a signal for maintaining the adjusted lighting control-related information.

8. The electronic device of claim 1, wherein the processor is further configured to control the display to display a lighting effect icon in response to identifying that the face is detected from the image.

9. A control method of an electronic device comprising a display, a camera module and a communication module, the control method comprising:
displaying, on the display, a preview image inputted through the camera module obtaining an exposure value for the preview image;
obtaining lighting control-related information from at least one lighting device by using the communication module;
displaying, on the display, the lighting control-related information obtained from the at least one lighting device, in response to identifying that a face is detected from the preview image;
in response to a selection of a lighting effect, displaying, on the display, the preview image to which an image effect corresponding to the selected lighting effect is applied; and
generating a signal for adjusting at least one piece of the lighting control-related information of the at least one lighting device based on the exposure value and a preset lighting control-related information setting value corresponding to the selected lighting effect, in response to a photographing signal input.

10. The control method of claim 9, wherein the lighting control-related information of the at least one lighting device includes an active state of the at least one lighting device, an inactive state of the at least one lighting device, position information of the at least one lighting device, a direction the at least one lighting device faces, an amount of light of the at least one lighting device, a color of the at least one lighting device, or a color temperature of the at least one lighting device.

11. The control method of claim 9, wherein the lighting control-related information setting value includes information about whether the at least one lighting device is activated or deactivated, a position value of the at least one lighting device, a direction the at least one lighting device faces, a light amount value of the at least one lighting device, a color value of the at least one lighting device, or a color temperature value of the at least one lighting device.

12. The control method of claim 9, further comprising displaying, on the display, lighting control-related information of a lighting device located within a preset distance from the electronic device to be included in the preview image.

13. The control method of claim 9, further comprising displaying, on the display, icons indicating a position and a direction of a lighting device located within a preset distance from the electronic device and the lighting control-related information of the lighting device located within the preset distance.

\* \* \* \* \*